(12) United States Patent
Gan et al.

(10) Patent No.: US 12,241,008 B2
(45) Date of Patent: Mar. 4, 2025

(54) TAPE INCLUDING ELECTRICALLY CONDUCTIVE POROUS MEDIUM

(71) Applicant: 3M INNOVATIVE PROPERTIES COMPANY, St. Paul, MN (US)

(72) Inventors: Hongyu Gan, Shanghai (CN); Yan Wu, Shanghai (CN); Jie Huang, Shanghai (CN); Jing Fang, Shanghai (CN); Jeffrey W. McCutcheon, Baldwin, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/560,465

(22) PCT Filed: May 26, 2021

(86) PCT No.: PCT/CN2021/096004
§ 371 (c)(1),
(2) Date: Nov. 13, 2023

(87) PCT Pub. No.: WO2022/246682
PCT Pub. Date: Dec. 1, 2022

(65) Prior Publication Data
US 2024/0254371 A1 Aug. 1, 2024

(51) Int. Cl.
*C09J 9/02* (2006.01)
*C09J 7/21* (2018.01)
*C09J 7/22* (2018.01)

(52) U.S. Cl.
CPC . *C09J 9/02* (2013.01); *C09J 7/21* (2018.01); *C09J 7/22* (2018.01); *C09J 2301/312* (2020.08); *C09J 2301/314* (2020.08)

(58) Field of Classification Search
CPC ......... C09J 9/02; C09J 7/21; C09J 7/22; C09J 2301/312; C09J 2301/314
See application file for complete search history.

(56) References Cited

U.S. PATENT DOCUMENTS

| 3,165,432 A | 1/1965 | Plaskett et al. |
| 5,230,736 A | 7/1993 | Schnodewind |

(Continued)

FOREIGN PATENT DOCUMENTS

| CA | 2007582 C | 6/2000 |
| CN | 105940072 A | 9/2016 |

(Continued)

OTHER PUBLICATIONS

Hongwei, "Measurements of Various Intermodulation Distortions (IMD, TD+N, DIM) using Multi-Instrument", Article from Virtins Technology, 2020, 34 Pages.

(Continued)

*Primary Examiner* — Christopher W Raimund
(74) *Attorney, Agent, or Firm* — Clifton F. Richardson

(57) ABSTRACT

A tape includes an electrically conductive adhesive first layer having opposite outermost first and second major surfaces. The first layer includes an electrically conductive porous medium and an adhesive disposed in, and extending through a thickness of, the porous medium to define at the first major surface, first regions of exposed adhesive and first regions of exposed porous medium and to define at the second major surface, second regions of exposed adhesive and second regions of exposed porous medium. The second major surface has a higher fraction of exposed porous medium than the first major surface. The porous medium can be a nonwoven fabric and the regions of exposed porous medium can be regions of exposed fibers.

18 Claims, 5 Drawing Sheets

(56) References Cited

U.S. PATENT DOCUMENTS

| | | | |
|---|---|---|---|
| 6,077,351 A | 6/2000 | Herzog et al. | |
| 6,346,491 B1 * | 2/2002 | DeAngelis | D04H 1/43828 |
| | | | 442/318 |
| 6,893,718 B2 | 5/2005 | Melancon et al. | |
| 9,061,478 B2 | 6/2015 | Choi et al. | |
| 2012/0295052 A1 * | 11/2012 | Choi | C09J 9/02 |
| | | | 428/323 |
| 2016/0312074 A1 | 10/2016 | Choi et al. | |
| 2016/0319165 A1 | 11/2016 | Choi et al. | |
| 2016/0333232 A1 * | 11/2016 | Choi | C09J 7/26 |
| 2020/0095479 A1 | 3/2020 | Fang et al. | |

FOREIGN PATENT DOCUMENTS

| | | | |
|---|---|---|---|
| FR | 2704576 B1 | | 6/1995 |
| JP | 2002327154 A | | 11/2002 |
| JP | 2003227090 A | * | 8/2003 |

OTHER PUBLICATIONS

International Search report for PCT International Application No. PCT/CN2021/096004, mailed on Jan. 26, 2022, 9 pages.

\* cited by examiner

TAPE INCLUDING ELECTRICALLY CONDUCTIVE POROUS MEDIUM

CROSS REFERENCE TO RELATED APPLICATIONS

This application is a national stage filing under 35 U.S.C. 371 of PCT/CN2021/096004, filed May 26, 2021, the disclosure of which is incorporated by reference in its entirety herein.

BACKGROUND

An electrically conductive tape can include a plurality of conductive particles in an adhesive layer thereof. The conductive particles can contact one another, thereby forming a conductive path.

SUMMARY

In some aspects of the present description, a tape including an electrically conductive adhesive first layer having opposite outermost first and second major surfaces is provided. The first layer includes an electrically conductive nonwoven layer comprising metal coated polymeric fibers and an adhesive disposed in, and extending through a thickness of, the nonwoven layer to define at the first major surface, first regions of exposed adhesive and first regions of exposed fibers of the nonwoven layer and to define at the second major surface, second regions of exposed adhesive and second regions of exposed fibers of the nonwoven layer. In plan view, the first major surface includes the first regions of exposed fibers at P1 percent by area and the second major surface includes the second regions of exposed fibers at P2 percent by area, where 15%<P1<70%, 30%<P2<95%, and P2−P1>5%.

In some aspects of the present description, a tape including an electrically conductive adhesive first layer having opposite outermost first and second major surfaces is provided. The first layer includes an electrically conductive porous medium and an adhesive disposed in, and extending through a thickness of, the porous medium to define at the first major surface, first regions of exposed adhesive and first regions of exposed porous medium and to define at the second major surface, second regions of exposed adhesive and second regions of exposed porous medium. In plan view, the first major surface includes the first regions of exposed porous medium at P1 percent by area and the second major surface includes the second regions of exposed porous medium at P2 percent by area, where 15%<P1<70%, 30%<P2<95%, and P2−P1>5%.

These and other aspects will be apparent from the following detailed description. In no event, however, should this brief summary be construed to limit the claimable subject matter.

DETAILED DESCRIPTION

Figure 1:
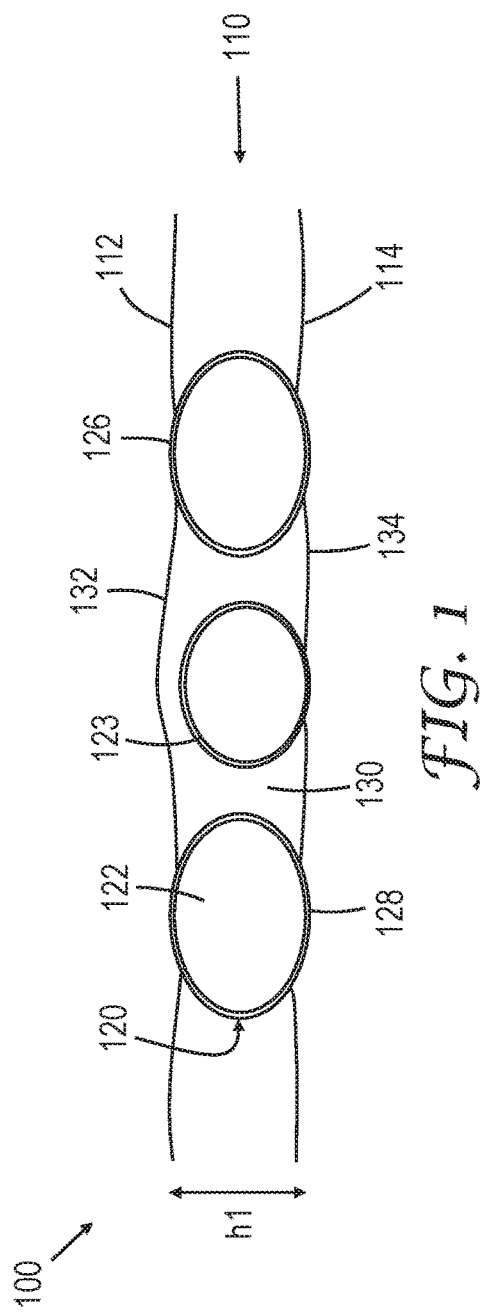
FIG. 1 is a schematic cross-sectional view of a tape, according to some embodiments.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Electrically conductive tapes can utilize an electrically conductive nonwoven fabric with an adhesive material including electrically conductive filler particles to bond adjacent substrates together and to provide electrical conduction between the substrates where exposed portions of the nonwoven fabric provide electrical contact with the substrates. However, such tapes have conventionally had a relatively low exposed area of nonwoven fabric at the major surface(s) of the adhesive layer or a relatively high variation in the exposed area. This can result in poor and/or variable performance in end use applications. According to some embodiments of the present description, tapes can be formed by coating an electrically conductive porous medium, such as a conductive nonwoven fabric, with an adhesive from one side of the porous medium such that the adhesive is forced through the porous medium. It has been found, according to some embodiments, that this can result in a tape having a higher area fraction of exposed conductive medium than conventional electrically conductive tapes. Furthermore, it has been found, according to some embodiments, that the exposed areas can have a sufficiently uniform distribution that regions of too low exposure for electrical contact or too high exposure for adequate bonding substantially do not occur. In some applications, the tape is used between different substrates such that it is desired that one side of the adhesive layer has a higher porous medium exposure than the opposite side. According to some embodiments, the coating processes described herein can naturally achieve this result. Furthermore, according to some embodiments, it has been found that the conductive tape has improved electrical properties compared to conventional tapes. For example, the conductive tape can have a low passive intermodulation (PIM) and/or a low electrical resistance without added conductive particles, according to some embodiments.

Electrically conductive tapes can be made by laminating adhesive layers on one or both sides of a conductive porous (e.g., nonwoven) carrier. An issue with such tapes is a short shelf life. Since the porous carrier is laminated with the adhesive layer after it has been dried, the pores of the carrier are not filled with adhesive right away. However, the adhesive can slowly (e.g., over months) be pushed into the pores of the carrier and this can lead to the issues of poor tape surface smoothness and adhesion. The tapes described herein, according to some embodiments, can be formed by coating a porous medium with an adhesive from one side of the porous medium such that the adhesive is forced through the porous medium. This can result in the pores being substantially filled with adhesive, which can enhance the stability and performance of the tape. The processes describe herein have also been found to allow a thinner tape to be made, according to some embodiments, than those made in conventional processes.

Electrically conductive tapes have typically included electrically conductive filler particles in the adhesive in order to achieve a desired electrical conductance. According to some embodiments of the present description, a desired electrical conductance can be achieved even when the adhesive is substantially free of electrically conductive filler particles due, at least in part, to an appropriate exposure of the conductive porous medium at the major surfaces of the electrically conductive adhesive layer.

FIG. 1 is a schematic cross-sectional view of a tape 100 including an electrically conductive adhesive first layer 110 having opposite outermost first and second major surfaces 112 and 114, according to some embodiments. The first layer 110 includes an electrically conductive porous medium 120 and an adhesive 130 disposed in, and extending through a thickness of, the porous medium 120 to define at the first major surface 112, first regions 132 of exposed adhesive and first regions 126 of exposed porous medium and to define at the second major surface 114, second regions 134 of exposed adhesive and second regions 128 of exposed porous medium. In some embodiments, in plan view (see, e.g., FIGS. 3-4), the first major surface 112 includes the first regions 126 of exposed porous medium at P1 percent by area and the second major surface 114 includes the second regions 128 of exposed porous medium at P2 percent by area, where 15%<P1<70% and 30%<P2<95%. In some embodiments, the first major surface 112 includes a substantially uniform distribution of the first regions 126 of exposed porous medium 120. In some embodiments, the second major surface 114 includes a substantially uniform distribution of the second regions 128 of exposed porous medium 120.

An exposed portion (e.g., exposed portion 132, 126, 134, or 128) of a major surface (e.g., major surface 112 or 114) of a layer (e.g., first layer 110) refers to a portion that is exposed to whatever adjacent layer is present at the major surface. The adjacent layer may be an air layer, for example, in which case the exposed portion may be described as exposed to air. The adjacent layer may be a release layer or a bonded substrate, for example, in which case the exposed portion may be described as exposed to the releaser layer or the bonded substrate.

In some embodiments, the porous medium 120 is or includes a nonwoven fabric including polymeric fibers 122 coated with a metal 123. In other embodiments, the porous medium is or includes a different type of fabric (e.g., a woven fabric) coated with a metal or other electrical conductor or a different type of porous medium such as a different type of open cell polymeric porous medium coated with a metal or other electrical conductor. In the embodiment schematically illustrated in FIG. 1, the porous medium 120 is a nonwoven fabric including metal coated polymeric fibers 122. The metal coating 123 may be or include copper, nickel, silver, gold, tin, cobalt, chromium, aluminum, or combinations thereof, for example. The metal coating 123 can be applied by plating or sputtering, for example. The polymeric fibers 122 may be or include polyester, nylon, polyurethane, vinylon, polyvinyl acetate, acrylate, cellulosic polymer, or combinations thereof, for example. The fibers can be metallized after the nonwoven fabric has been formed or the nonwoven fabric can be made from metalized fibers.

In embodiments where the porous medium 120 is a nonwoven fabric, the tape 100 may be described as including an electrically conductive adhesive first layer 110 having opposite outermost first and second major surfaces 112 and 114, where the first layer 110 includes an electrically conductive nonwoven layer 120 including metal coated polymeric fibers 122 and an adhesive 130 disposed in, and extending through a thickness of, the nonwoven layer 120 to define at the first major surface 112, first regions 132 of exposed adhesive and first regions 126 of exposed fibers of the nonwoven layer and to define at the second major surface 114, second regions 134 of exposed adhesive and second regions 128 of exposed fibers of the nonwoven layer 120. In some embodiments, in plan view, the first major surface 112 includes the first regions 126 of exposed fibers at P1 percent by area and the second major surface 112 includes the second regions 128 of exposed fibers at P2 percent by area, where 15%<P1<70% and 30%<P2<95%. In some embodiments, the first major surface 112 has a substantially uniform distribution of the first regions 126 of exposed fibers. In some embodiments, the second major surface 114 has a substantially uniform distribution of the second regions 128 of exposed fibers.

In some embodiments, the first and/or second major surface consists essentially of exposed porous medium (e.g., exposed fibers) and exposed adhesive. In other words, in some embodiments, in plan view, the first (and/or second) major surface includes the exposed adhesive at the major surface at about 100–P1 (or 100–P2) percent by area.

In some embodiments, as schematically illustrated in FIG. 1, for example, P2>P1. In some embodiments, P2−P1>5%, or P2−P1>10%, or P2−P1>15%, or P2−P1>20%. In some such embodiments, or in other embodiments, 15%<P1<60%, 20%<P1<60%, or 20%<P1<50%, or 20%<P1<40%. In some such embodiments, or in other embodiments, 30%<P2<90%, or 35%<P2<85%, or 40%<P2<80%, or 40%<P2<75%, or 40%<P2<70%.

The adhesive 130 can be a pressure sensitive adhesive (PSA). To achieve desired characteristics, the polymer(s) used for the adhesive may be tailored to have a resultant glass transition temperature (Tg) of less than about 0° C. Examples of suitable PSA materials include, for example, rubber-based PSAs, silicone based PSAs, and acrylic based PSAs. Particularly suitable pressure sensitive adhesive are (meth)acrylate copolymers. Such copolymers typically are derived from monomers containing about 40% by weight to about 98% by weight, often at least about 70% by weight, or at least about 85% by weight, or even at least about 90% by weight, of at least one alkyl (meth)acrylate monomer that, as a homopolymer, has a Tg of less than about 0° C. Examples of such alkyl (meth)acrylate monomers include those in which the alkyl groups contain from about 4 carbon atoms to about 14 carbon atoms and include, for example, n-butyl acrylate, 2-ethylhexyl acrylate, isooctyl acrylate, isononyl acrylate, isodecyl acrylate, and mixtures thereof. Optionally, other vinyl monomers and alkyl (meth)acrylate monomers which, as homopolymers, have a Tg greater than 0° C., such as, for example, methyl acrylate, methyl methacrylate, isobornyl acrylate, vinyl acetate, and/or styrene, may be utilized in conjunction with one or more of the low Tg alkyl (meth)acrylate monomers and copolymerizable polar monomers. The term (meth)acrylate is used to refer to both acrylate and methacrylate materials. Other useful adhesives are described in U.S. Pat. Appl. Pub. No. 2016/0333232 (Choi et al.) and in U.S. Pat. No. 9,061,478 (Choi et al.), for example.

It has been found that softer adhesives can result in better surface uniformity and have better aging properties than harder adhesives. In some embodiments, the adhesive 130 has a Young's modulus E' at 25° C. of less than about 1 MPa and/or a loss modulus E" at 25° C. of less than about 0.4 MPa and/or a loss tangent (tan delta) at 25° C. of less than about 0.7. The elastic properties of the adhesive can be adjusted by suitable selection of monomers (e.g., aliphatic monomers can result in softer adhesives than aromatic monomers and/or monomers resulting in linear molecules can result in softer adhesives compared to monomers resulting in branched molecules) in the adhesive formulation, as would be appreciated by one of ordinary skill in the art.

Figure 2:
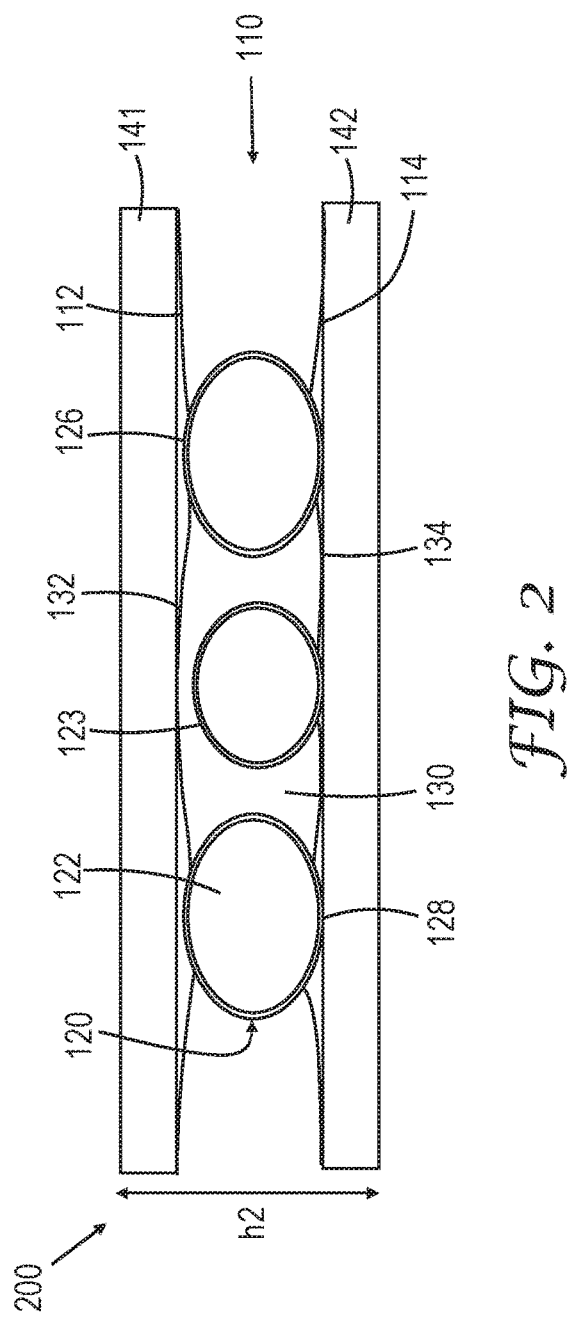
FIG. 2 is a schematic cross-sectional view of a tape including layers on opposite sides of an adhesive layer, according to some embodiments.

In some embodiments, the tape 100 further includes at least one release liner. FIG. 2 is a schematic cross-sectional view of a tape 200, according to some embodiments, that may correspond to tape 100 but that includes first and second layers 141 and 142 disposed on the respective first and second major surfaces 112 and 114. In some embodiments, the each of the first and second layers 141 and 142 are release liners and the tape 200 may be described as a double sided tape. In some embodiments, one of the first and second layers 141 and 142 is a release liner and the other of the first and second layers 141 and 142 is a backing layer such as a metal foil and the tape 200 may be described as a single sided tape.

The tape 100 and the first layer 110 of FIG. 1 have an average thickness h1. The tape 200 of FIG. 2 has an average thickness h2. In some embodiments, the tape 100 or 200 has an average thickness (h1 or h2) in a range of about 10 micrometers to about 200 micrometers, or 10 micrometers to about 100 micrometers, or about 15 micrometers to about 60 micrometers, or about 20 micrometers to about 50 micrometers. In some embodiments, the first layer 110 has an average thickness h1 in a range of about 10 micrometers to about 200 micrometers, or about 10 micrometers to about 100 micrometers, or about 15 micrometers to about 60 micrometers, or about 20 micrometers to about 50 micrometers, or about 20 micrometers to about 40 micrometers, or about 20 micrometers to about 35 micrometers.

Figure 3:
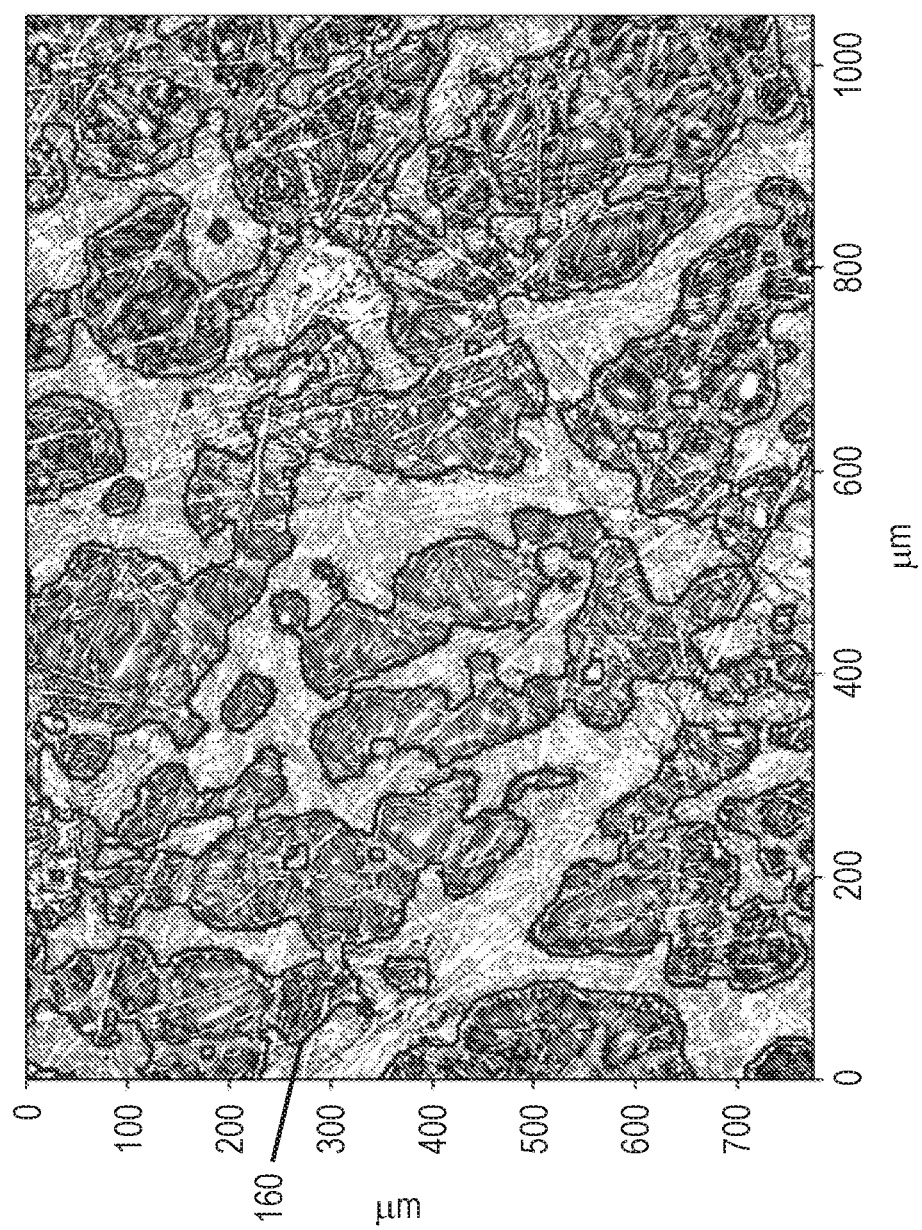
FIG. 3 is a plan view image of a portion of a major surface of an electrically conductive layer of an exemplary tape.

The fraction of exposed adhesive and exposed porous medium at a major surface can be determined using an optical microscope. FIG. 3 is an image of a portion of a major surface of an exemplary first layer (e.g., corresponding to first layer 110) where regions of exposed adhesive appear darker than regions of exposed porous medium. Lines 160 have been drawn around the regions of exposed adhesive. The area within the lines 160 can be determined using standard digital image processing techniques. The exposed porous medium area percent at the major surface is then 100 percent by area minus the percent by area within the lines 160.

Machine learning models such as object detection, defect classification, segmentation detection, and customized image feature extraction computer vision algorithms and methods may be applied to determine the area fraction of exposed porous medium. Both rule-based and deep learning-based models can be effectively and efficiently applied to the irregular shapes of protruding fibers, for example. One type of suitable instance image segmentation model is known in the art as a Mask-RCNN model. Such models can detect the objects (e.g., exposed fibers or other porous medium) and segment them from the background accurately. Once the model has been trained with a suitable set of similar labeled images, the objects can be segmented and covered with masks of the same size. An advantage of using Mask-RCNN over conventional computer vision techniques is that Mask-RCNN is not sensitive to background noise. For example, small dots having very different sizes from target objects will not be detected and segmented from the background in Mask-RCNN. Rule based algorithms and non-neural network methods are also suitable ways to determine the exposed area. Another suitable method is to use a hybrid model including deep neural network and non-neural network computer vision machine learning models.

Figure 4:
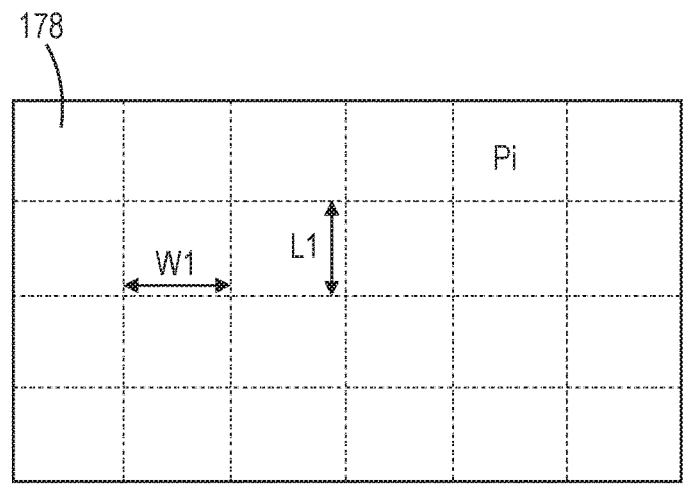
FIG. 4 is a plan view of a major surface of an electrically conductive layer divided into areas having width W1 and length L1, according to some embodiments.
Figure 5:
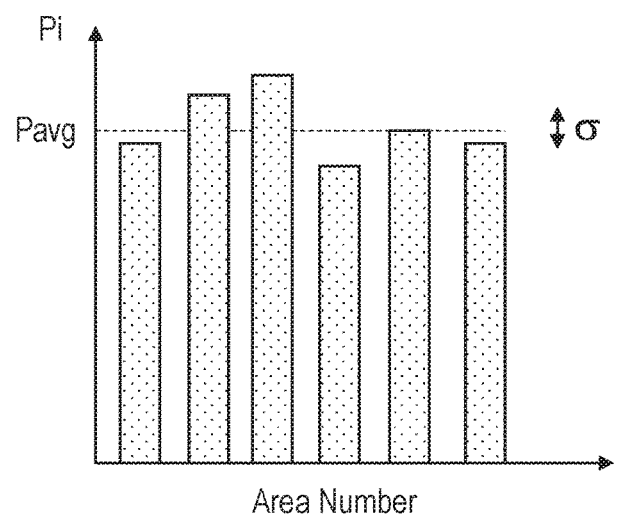
FIG. 5 schematically illustrates a distribution of exposed porous medium or exposed fiber area percentages for the areas of FIG. 4, according to some embodiments.

FIGS. 4-5 schematically illustrate determining average and standard deviation of the exposed porous medium (e.g., exposed fiber) area percentage, according to some embodiments. FIG. 4 is a plan view of a major surface of a first layer 110 divided into a plurality of rectangular areas 178 having width W1 and length L1. A plan view of a major surface of a layer is a view along a direction substantially normal to the layer. The major surface in FIG. 4 can correspond to the first major surface 112 or the second major surface 114. The width W1 and the length L1 may each be in a range of about 0.7 mm to about 5 mm, or about 1 mm to about 5 mm, or about 2 mm to about 5 mm, or about 3 mm to about 5 mm, or about 0.7 mm to about 3 mm, or about 0.7 mm to about 2 mm, for example. The rectangular areas 178 may each have a same width and length or different lengths and widths may be used for different rectangular areas 178 where each length and each width is in a range of about 0.7 mm to about 5 mm or another range described elsewhere herein. A square is a special case of a rectangle and in some embodiments, W1 and L1 are equal. In some embodiments, for each area 178, W1 and L1 are each about 1 mm, or about 3 mm, or about 5 mm. Each area 178 can be labeled with an area number such that the $i^{th}$ area includes the regions 126 or 128 at Pi percent by area. FIG. 5 schematically illustrates a distribution of the Pi values of the areas 178. An average (mean) Pavg and a standard deviation σ are indicated. The analysis of FIGS. 4-5 can be separately applied to the first major surface 112 and to the second major surface 114. The values P1 and P2 for the first and second major surfaces 112 and 114 can be approximated as the Pavg determined for these surfaces. The total number of areas 178 are chosen to be sufficiently high that the mean and standard deviation of the exposed porous medium (e.g., exposed fiber) area percentage determined using the areas 178 represent the mean and standard deviation for the major surface. For example, the total number of areas 178 can be chosen to be sufficiently high that the mean and standard deviation of the exposed porous medium (e.g., exposed fiber) area percentage do not significantly change when more areas are included. In some embodiments, the total number of areas 178 is at least 10, or at least 15, or at least 20 and may be up to 100 or up to 50, for example.

The distribution of the first regions 126 (resp., second regions 128) can be described as substantially uniform when a standard deviation σ of exposed porous medium area percent or exposed fiber area percent is less than 0.35 P1 (resp., 0.35 P2) when measured over rectangular areas 178 of the first major surface 112 (resp., second major surface 114) where each rectangular area 178 has a length L1 and a width W1 each in a range of about 0.7 mm to about 5 mm. The rectangular areas should be understood to be rectangular in plan view.

In some embodiments, the first major surface 112 has a substantially uniform distribution of the first regions 126 of exposed porous medium. In some embodiments, the first major surface has a distribution of the first regions of exposed porous medium 120 having a standard deviation σ of exposed porous medium area percent 112 of less than about 15%, or less than about 10%, or less than about 7%, or less than about 5%, when measured over rectangular areas of the first major surface such that each rectangular area has a length L1 and a width W1 each in a range of about 0.7 mm to about 5 mm or in a range described elsewhere herein. The standard deviation σ for the first major surface may be as low as about 3%, or about 2%, or about 1%, for example. In some embodiments, the second major surface 114 has a distribution of the second regions 128 of exposed porous medium 120 having a standard deviation σ of exposed porous medium area percent of the second major surface 114 of less than about 30%, or less than about 25%, or less than about 20%, or less than about 18% measured over rectangular areas of the second major surface such that each rectangular area has a length L1 and a width W1 each in a range of about 0.7 mm to about 5 mm or in a range described elsewhere herein. The standard deviation σ for the first major surface may be as low as about 6%, or about 4%, or about 3%, for example. In some embodiments, the first major surface 112 has a distribution of the first regions of exposed porous medium 120 having a standard deviation σ of exposed porous medium area percent of less than about 0.35 P1, or less than about 0.3 P1, or less than about 0.28 P1, or less than about 0.26 P1, or less than about 0.25 P1, or less than about 0.24 P1, or less than about 0.23 P1, when measured over rectangular areas of the first major surface 112 as described further elsewhere in herein. In some embodiments, the second major surface 114 has a distribution of the second regions 128 of exposed porous medium 120 having a standard deviation σ of exposed porous medium area percent of less than about 0.4 P2, or less than about 0.38 P2, or less than about 0.36 P2, or less than about 0.35 P2, or less than about 0.34 P2, or less than about 0.33 P2, when measured over rectangular areas of the first major surface 112 as described further elsewhere in herein.

In some embodiments, for a regular array of rectangular areas of the first major surface 112 numbering at least 20 in total, in plan view, each rectangular area includes the first regions 126 of exposed porous medium 120 at greater than about 15 percent by area, or greater than about 18 percent by area, or greater than about 20 percent by area, or greater than about 22 percent by area, where each rectangular area has a length L1 and a width W1 each in a range of about 0.7 mm to about 5 mm or in a range described elsewhere herein. In some such embodiments, for the regular array of rectangular areas of the first major surface 112 numbering at least 20 in total, in plan view, each rectangular area includes the first regions 126 of exposed porous medium 120 at less than about 70 percent by area, or less than about 65 percent by area, or less than 60 percent by area. In some embodiments, for a regular array of rectangular areas of the second major surface 114 numbering at least 20 in total, in plan view, each rectangular area includes the second regions 128 of exposed porous medium 120 at greater than about 30 percent by area, or greater than about 35 percent by area, or greater than about 40 percent by area, where each rectangular area has a length L1 and a width W1 each in a range of about 0.7 mm to about 5 mm or in a range described elsewhere herein. In some such embodiments, for the regular array of rectangular areas of the second major surface 114 numbering at least 20 in total, in plan view, each rectangular area includes the second regions 128 of exposed porous medium 120 at less than about 95 percent by area, or less than about 90 percent by area, or less than about 85% by area, or less than about 80% by area. The regular array of rectangular areas can be a two-dimensional periodic array where there are no gaps between adjacent rectangular areas.

In some embodiments, the porous medium is a nonwoven fabric. In some embodiments, the first major surface 112 has a substantially uniform distribution of the first regions 126 of exposed fibers 122. In some embodiments, the first major surface has a distribution of the first regions 126 of exposed fibers 122 having a standard deviation σ of exposed fiber area of less than about 15% or less than about 10%, or less than about 7%, or less than about 5%, when measured over rectangular areas of the first major surface such that each rectangular area has a length L1 and a width W1 each in a range of about 0.7 mm to about 5 mm or in a range described elsewhere herein. In some embodiments, the second major surface 114 includes a distribution of the second regions 128 of exposed fibers 122 having a standard deviation of exposed fiber area of less than about 30%, or less than about 25%, or less than about 20%, or less than about 18%, when measured over rectangular areas of the second major surface such that each rectangular area has a length L1 and a width W1 each in a range of about 0.7 mm to about 5 mm or in a range described elsewhere herein. In some embodiments, the first major surface 112 has a distribution of the first regions 126 of exposed fibers 122 having a standard deviation σ of exposed fiber area of less than about 0.35 P1, or less than about 0.30 P1, less than about 0.28 P1, or less than about 0.26 P1, or less than about 0.25 P1, or less than about 0.24 P1, or less than about 0.23 P1 when measured over rectangular areas as described further elsewhere herein. In some embodiments, the second major surface 114 includes a distribution of the second regions 128 of exposed fibers 122 having a standard deviation of exposed fiber area of less than about 0.4 P2, or less than about 0.38 P2, or less than about 0.36 P2, or less than about 0.35 P2, or less than about 0.34 P2, or less than about 0.33 P2, when measured over rectangular areas as described further elsewhere herein.

In some embodiments, for a regular array of rectangular areas of the first major surface 112 numbering at least 20 in total, in plan view, each rectangular area includes the first regions 126 of exposed fiber 122 at greater than about 15 percent by area, or greater than about 20 percent by area, or greater than about 25 percent by area, or greater than about 30 percent by area, where each rectangular area has a length L1 and a width W1 each in a range of about 0.7 mm to about 5 mm or in a range described elsewhere herein. In some such embodiments, for the regular array of rectangular areas of the first major surface 112 numbering at least 20 in total, in plan view, each rectangular area includes the first regions 126 of exposed fiber 122 at less than about 70 percent by area, or less than about 65 percent by area, or less than about 60 percent by area. In some embodiments, for a regular array of rectangular areas of the second major surface 114 numbering at least 20 in total, in plan view, each rectangular area includes the second regions 128 of exposed fiber 122 at greater than about 30 percent by area, or greater than about 35 percent by area, or greater than about 40 percent by area, where each rectangular area has a length L1 and a width W1 each in a range of about 0.7 mm to about 5 mm or in a range described elsewhere herein. In some such embodiments, for the regular array of rectangular areas of the second major surface 114 numbering at least 20 in total, in plan view, each rectangular area includes the second regions 128 of exposed fiber 122 at less than about 95 percent by area, or less than about 90 percent by area, or less than about 85 percent by area, or less than about 80 percent by area. The regular array of rectangular areas can be a two-dimensional periodic array where there are no gaps between adjacent rectangular areas.

Figure 6:
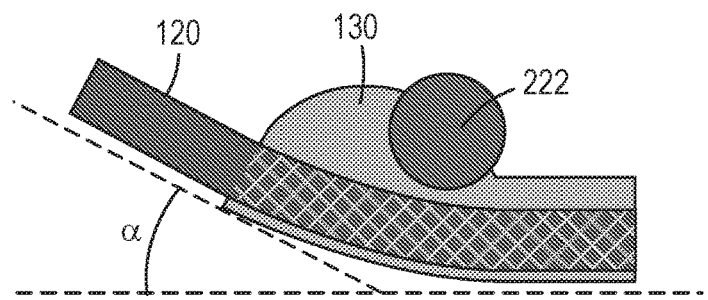
FIG. 6 is a schematic cross-sectional view illustrating coating a porous medium, such as a nonwoven fabric, with an adhesive, according to some embodiments.

The tapes described herein can be formed by coating a porous medium with an adhesive from one side of the porous medium such that the adhesive penetrates through the porous medium. Any suitable coating method may be used. One suitable method is to use a Mayer rod. A Mayer rod includes wire wound around a cylinder and is characterized by a Mayer rod size number which gives the wire diameter in mils. FIG. 6 is a schematic cross-sectional view of coating a porous medium 120, such as a nonwoven fabric, with an adhesive 130 using a Mayer rod 222 at a wrapping angle α, according to some embodiments. It has been found that using a Mayer rod having a lower Mayer rod size number (e.g., 15 to 26) provides better coating uniformity resulting in higher peel force than using a Mayer rod having a higher Mayer rod size number (e.g., 30 to 33). It has further been found that increasing the wrapping angle α can result in improved penetration of the adhesive through the porous medium so that a sufficient quantity of adhesive is present at the second major surface 114 when the porous medium is coated from the first major surface 112. It has also been found that when the porous medium is a nonwoven fabric, the tension in the fabric near the Mayer rod can be adjusted to further control how the adhesive is deposited. For example, a higher tension keeps the fabric and Mayer rod in closer contact resulting in a higher fiber exposure. The coated side typically has a lower exposed porous medium area percent than the opposite side. A backing layer such as a release liner can be applied on a side of the porous medium 120 opposite the Mayer rod. The adhesive can be applied in a solvent which is subsequently evaporated in an oven. The percent solids of the adhesive in solvent may be in a range of 30 to 45 weight percent and can be adjusted to give an appropriate rheology for coating.

It has been found that tapes made by coating a porous medium with an adhesive from one side of the porous medium such that the adhesive penetrates through the porous medium can result in improved electrical properties (e.g., low electrical resistance and/or low passive intermodulation) and/or improved adhesion compared to conventional tapes.

Figure 7:
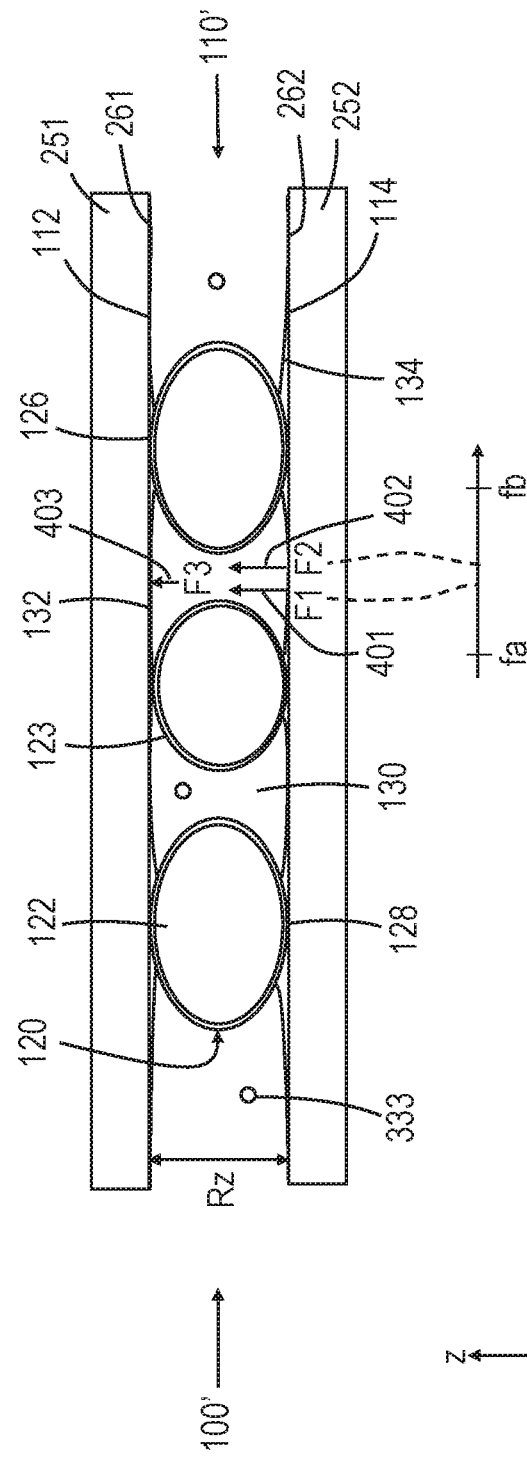
FIG. 7 is a schematic cross-sectional view of a tape disposed between and bonding together two substrates, according to some embodiments.

FIG. 7 is a schematic cross-sectional view of a tape 100' disposed between and bonding together substrates 252 and 251, according to some embodiments. The tape 100' and the first layer 110' can correspond to tape 100 and first layer 110, respectively, except that first layer 110' includes optional electrically conductive filler particles 333. The electrically conductive filler particles 333 may be included to reduce electrical resistance or may be included at a sufficiently low volume loading as to negligibly affect the electrical properties of the tape 100'. If included, the electrically conductive filler particles 333 can be in the form of metallic particles or metal coated insulative (e.g., polymeric) particles or combinations thereof, for example. The first layer 110, 110' may be described as substantially free of electrically conductive filler particles 333 if removing the conductive filler particles 333 and replacing them with an equal volume of adhesive 130 changes an electrical resistance Rz of the first layer 110, 110' in a thickness direction (z-direction of FIG. 7, referring to the illustrated x-y-z coordinate system) of the first layer 110, 110' by less than about 10%. In some embodiments, removing the conductive filler particles 333 and replacing it with an equal volume of adhesive 130 changes the electrical resistance Rz of the first layer 110, 110' in the thickness direction (z-direction) of the first layer 110, 110' by less than about 5%, or less than about 3%, or less than about 2%. In some embodiments, electrically conductive filler particles 333 is included at less than about 5 volume percent, or less than about 3 volume percent, or less than about 2 volume percent. In some embodiments the first layer 110, 110' has an electrical resistance Rz in a thickness direction (z-direction) of the first layer of less than about 300 mΩ, or less than about 200 mΩ, or less than about 100 mΩ, or less than about 50 mΩ, or less than about 35 mΩ, or less than about 30 mΩ, or less than about 29 mΩ, or less than about 28 mΩ. In some such embodiments, or in other embodiments, the first layer 110, 110' is free or substantially free of electrically conductive filler particles 333. The electrical resistance Rz can be as low as about 24 mΩ, or as low as about 20 mΩ, or as low as about 16 mΩ, for example. The electrical resistance is generally reduced when the exposed fraction of porous conductive medium is increased, for example.

In some embodiments, the tape has a low passive intermodulation (PIM). PIM is generated when two or more signals at different frequencies mix with each other due to electrical nonlinearities. In some cases, the PIM signal can have a frequency close to the input frequencies and this can cause undesired interference. The substrates 251 and 252 have respective major surfaces 261 and 262 facing the first layer 110'. The substrate 252 may be gold and/or include a gold major surface 262 (e.g., by being plated with gold). The substrate 251 may be stainless steel and/or include a stainless steel major surface 261. The first layer 110' can be disposed with the second major surface 114 facing the gold surface 262 and the first major surface 112 facing the stainless steel surface 261. In some embodiments, when first and second electrical signals 401 and 402 propagate in the thickness direction (z-direction) of the first layer 110, 110' between gold and stainless steel surfaces 262 and 261 at respective frequencies F1 and F2, any intermodulation signal 403 generated from the first and second electrical signals and having a frequency F3 equal to nF1+mF2, where m and n are positive or negative integers, has a power of less than about −88 dB, or less than about −90 dB, or less than about −94 dB, or less than about −95 dB, or less than about −97 dB, or less than about −98 dB, or less than about −99 dB, or less than about −100 dB, or less than about −101 dB relative to a total power of the first and second signals 401 and 402. The power may be as low as about −110 dB or as low as about −105 dB relative to a total power of the first and second signals 401 and 402. F1 and F2 are each selected from a frequency range of fa to fb. The frequency fa can be about 100 MHz, or about 200 MHz, or about 300 MHz, or about 500 MHz, or about 700 MHz, or about 800 MHz, or about 850 MHz and the frequency fb can be about 10 GHz, or about 5 GHz, or about 3 GHz, or about 1 GHz, or about 900 MHz, for example. In some embodiments, each of F1 and F2 is in a range of about 100 MHz and 10 GHz, and a difference between F1 and F2 is in a range of about 5 MHz to about 1 GHz, or about 10 MHz to about 800 MHz, or about 10 MHz to about 700 MHz, or about 10 MHz to about 100 MHz, or about 20 MHz to about 40 MHz, or about 25 MHz to about 35 MHz. In some embodiments, each of F1 and F2 is in a range of about 850 MHz to about 900 MHz. For example, in some embodiments, F1 may be 869 MHz and F2 may be 894 MHz. When these signals combine to form third order (when the sum of the absolute values of m and n is 3) products, PIM signals having frequencies of, for example, 2F1−F2=844 MHz and 2F2−F1=919 MHz may be generated.

Figure 8:
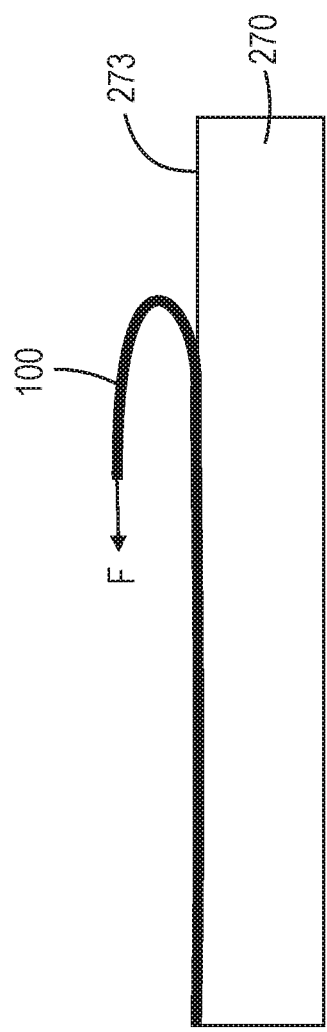
FIG. 8 is a schematic cross-sectional view illustrating a 180 degree peel of a tape from a substrate, according to some embodiments.

FIG. 8 is a schematic cross-sectional view illustrating a 180 degree peel of a tape 100 from a substrate 270 having a major surface 273, according to some embodiments. The substrate 270 can be a stainless steel substrate, for example. In some embodiments, the tape 100, or any tape described herein, can have a 180 degree peel strength of at least about 0.1 N/mm, or at least about 0.2 N/mm, or at least about 0.25 N/mm, or at least about 0.3 N/mm from a stainless steel surface 273. The peel strength can be determined using a peel speed of about 300 mm/min (e.g., 304.8 mm/min), for example. The peel strength can be in the any of these ranges for at least one of the first and second major surfaces 112 and 114 facing the stainless steel surface 273. In some embodiments, peel strength is in the any of these ranges when the first major surface 112 faces the stainless steel surface 273 and when the second major surface 114 faces the stainless steel surface 273. The peel strength can be determined, for example, according to ASTM D3330/D3330M-04 (Reapproved 2018), "Standard Test Method for Peel Adhesion of Pressure-Sensitive Tape". Test Method C of this standard can be used when the tape is double sided and Test Method A of this standard can be used with the tape is single sided (e.g., when layer 142 is a backing layer for the tape 200).

In some embodiments, the tape 300 has a peel strength in any of the ranges described herein and an electrical resistance in any of the ranges described herein. In some such embodiments, or in other embodiments, the adhesive is substantially free of electrically conductive filler. In some such embodiments, or in other embodiments, the tape results in an intermodulation in any of the ranges described herein.

EXAMPLES

Sample Preparation

Various samples were made by coating a 30 micrometer thick conductive nonwoven fabric (obtained from Jiaxin Purification Equipment Co. Ltd.) with an acrylate pressure sensitive adhesive composition containing about 40 weight percent solids. The acrylate pressure sensitive adhesive composition included a bisamide crosslinking agent and was similar to those described in U.S. Pat. No. 6,893,718 (Melancon et al.). The conductive nonwoven fabric was a polyethylene terephthalate (PET) nonwoven with a sputtered multilayer nickel/copper/nickel coating. The conductive nonwoven was coated with the adhesive composition from one side using a Mayer rod without supporting liner or roll underneath. The coated nonwoven was then sent to an oven for solvent evaporation. Samples having a total thickness of about 40 micrometers were made using various Mayer rods (characterized by the Mayer rod size number) and the peel strength was measured as described under "Test Methods". Results are provided in the table below.

| Mayer rod size # | Peel strength with coated side facing stainless steel (N/mm) | Peel strength with uncoated side facing stainless steel (N/mm) |
|---|---|---|
| 15 | 0.750 | 0.613 |
| 26 | 0.650 | 0.561 |
| 30 | 0.432 | 0.255 |
| 33 | 0.418 | 0.219 |

Various other samples (Examples 1-3) were made similarly to those described above, but with lower coating thicknesses. The conductive adhesive layer of Example 1 had an average thickness (e.g., corresponding to average thickness h1 of FIG. 1) of about 35 micrometers. The conductive adhesive layer of Examples 2-3 each had an average thickness (e.g., corresponding to average thickness h1 of FIG. 1) of about 30 micrometers. The coating conditions (the total coating weight and the tension in the nonwoven) were varied for Examples 1-3, resulting in the different thicknesses and the different distributions of exposed fiber shown under "Test Results". The total coating weight was reduced in Examples 2-3 compared to Example 1 resulting in thinner adhesive layers. A higher tension was used in the nonwoven near the coater in Examples 2-3 compared to Example 1 resulting in increased fiber exposure.

Comparative Example CE1 was 3M 5113DF, a double sided conductive tape available from 3M Company, St. Paul, MN.

Comparative Example CE2 was 3M Electrically Conductive Transfer Tape 9701, available from 3M Company, St. Paul, MN, which is a double sided tape with a nickel/copper-coated conductive nonwoven carrier. Comparative Example CE2 had a 50 micrometer thick electrically conductive adhesive layer.

Test Methods

Peel test sample preparation: Stainless steel panels were wiped three times with a tissue wetted with isopropanol using heavy hand pressure. The cleaned panels were air dried for 10 min. 25.4 mm×200 mm adhesive tape samples were placed onto the stainless steel panels, and a 1 kg rubber roller was rolled back and forth once on top of the tape to adhere the tape sample to the surface of the stainless steel panel.

180° peel force test (23° C., 60% Relative Humidity): All samples were held at a temperature of 23° C. and a relative humidity of 60% for 20 min prior to peel testing at room temperature (about 23° C.). Procedures of the room temperature peel force tests were as described in ASTM D3330/D3330M-04 (Reapproved 2018), "Standard Test Method for Peel Adhesion of Pressure-Sensitive Tape". Peel strength tests were performed using an INSTRON tensile tester (available from Instron, Norwood, MA, US) at a peeling speed of 304.8 mm/min. Samples were tested with the coated side (first major surface) facing the stainless steel panel and with the opposite side (second major surface) facing the stainless steel panel.

Conductivity (Z-Axis Electrical Resistance through Adhesive): Two strips of the conductive tape were placed in 10 mm×10 mm on center of the electrodes on a PCB board. The size of PCB board was 50 (X-axis) mm×75 (Y-axis) mm and the thickness was 1.6 mm. The electrodes on the board were 10 mm wide. The distance between electrodes was 30 mm. After initial hand lamination to provide for a 10 mm×10 mm contact area between the tape and electrodes, another PCB board was attached on the other side of the tape, the size of this board was 10 mm×50 mm. Then, a 2 kg rubber roller was applied across the board to simulate a typical manufacturing process that might be used to apply the tapes to a surface. After 20 minutes of dwell time, the DC resistance between the electrodes were measured with a micro-ohm meter.

Passive Intermodulation (PIM) testing: The conductive tape was placed between in a test fixture between gold and stainless steel surfaces. Two currents having frequencies of 860 and 890 MHz were transmitted through the thickness of the conductive tape from the gold to the stainless steel surfaces and a reflected third order intermodulation signal was measured. The testing was carried out as generally described for CCIF3 IMD in Hongwei, "Measurements of Various Intermodulation Distortions (IMD, TD+N, DIM) using Multi-Instrument", Virtins Technology, August 2020.

Exposed fiber area percent: Digital images of the outermost major surfaces of the conductive tape were obtained using an optical microscope (Keyence VHX-5000 with VH-100R lens, available from Keyence Corporation, Osaka, Japan) and the exposed fiber area percent for each surface was determined as generally described in relation to FIG. 3. The average (mean) and standard deviation were determined from measurements of at least 10 about 3 to 4 mm by about 3 to 4 mm areas of each surface.

Test Results

Conductive Tapes were measured as described in "Test Methods". Results for electrical properties and peel strength are reported in the following table.

| Example | Resistance in thickness direction (mΩ) | Peel strength first major surface facing stainless steel (N/mm) | Peel strength first major surface facing stainless steel (N/mm) | PIM (dBc) |
|---|---|---|---|---|
| CE1 | 32 | 0.61 | 0.60 | −89 |
| CE2 | 59 | 0.40 | 0.42 | −93 |
| 1 | 26 | 0.56 | 0.40 | −89 |
| 2 | 25 | 0.36 | 0.21 | −99 |
| 3 | 27 | 0.37 | 0.29 | −102 |

Results for exposed fiber area are reported in the following table.

| Example | Exposed fiber area percent at first major surface (P1) | Exposed fiber area percent at second major surface (P2) | P2 − P1 | Standard Deviation of exposed fiber area percent at first major surface | Standard Deviation of exposed fiber area percent at second major surface |
|---|---|---|---|---|---|
| CE1 | 9.74% | 9.75% | 0.01% | 0.10% | 0.10% |
| CE2 | 12.87% | 14.64% | 1.77% | 2.38% | 1.70% |
| 1 | 15.22% | 36.28% | 21.06% | 3.23% | 8.80% |
| 2 | 22.88% | 58.56% | 35.68% | 4.12% | 15.10% |
| 3 | 21.27% | 43.74% | 22.47% | 4.39% | 13.56% |

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. A tape comprising an electrically conductive adhesive first layer having opposite outermost first and second major surfaces, the first layer comprising:
   an electrically conductive nonwoven layer comprising metal coated polymeric fibers; and
   an adhesive disposed in, and extending through a thickness of, the nonwoven layer to define at the first major surface, first regions of exposed adhesive and first regions of exposed fibers of the nonwoven layer and to define at the second major surface, second regions of exposed adhesive and second regions of exposed fibers of the nonwoven layer,
   wherein, in plan view, the first major surface comprises the first regions of exposed fibers at P1 percent by area, the second major surface comprises the second regions of exposed fibers at P2 percent by area, 15%<P1<70%, 30%<P2<95%, P2-P1>5%,
   wherein when first and second electrical signals propagate in the thickness direction of the first layer between gold and stainless steel surfaces at respective frequencies F1 and F2, any intermodulation signal generated from the first and second electrical signals and having a frequency F3 equal to nF1+mF2, m and n positive or negative integers, has a power of less than about −95 dB relative to a total power of the first and second signals.

2. The tape of claim 1, wherein the first major surface comprises a distribution of the first regions of exposed fibers comprising a standard deviation of exposed fiber area percent of less than about 10% when measured over rectangular areas of the first major surface such that each rectangular area has a length and a width each in a range of about 0.7 mm to about 5 mm.

3. The tape of claim 1, wherein the first major surface comprises a distribution of the first regions of exposed fibers comprising a standard deviation of exposed fiber area of less than about 0.28 P1 when measured over rectangular areas of the first major surface such that each rectangular area has a length and a width each in a range of about 0.7 mm to about 5 mm.

4. The tape of claim 1, wherein the second major surface comprises a distribution of the second regions of exposed fibers comprising a standard deviation of exposed fiber area percent of less than about 25% when measured over rectangular areas of the second major surface such that each rectangular area has a length and a width each in a range of about 0.7 mm to about 5 mm.

5. The tape of claim 1, wherein the second major surface comprises a distribution of the second regions of exposed fibers comprising a standard deviation of exposed fiber area percent of less than about 0.35 P2 when measured over rectangular areas of the second major surface such that each rectangular area has a length and a width each in a range of about 0.7 mm to about 5 mm.

6. The tape of claim 1, wherein for a regular array of rectangular areas of the first major surface numbering at least 20 in total, in plan view, each rectangular area comprises the first regions of exposed fiber at greater than about 15 percent by area, each rectangular area having a length and a width each in a range of about 0.7 mm to about 5 mm.

7. The tape of claim 1, wherein for a regular array of rectangular areas of the second major surface numbering at least 20 in total, in plan view, each rectangular area comprises the second regions of exposed fiber at greater than about 30 percent by area, each rectangular area having a length and a width each in a range of about 0.7 mm to about 5 mm.

8. The tape of claim 1, wherein 20%<P1<40% and P2-P1>15%.

9. The tape of claim 1, wherein the first layer has an electrical resistance in a thickness direction of the first layer of less than about 300 m2, and wherein the first layer is substantially free of electrically conductive filler particles.

10. The tape of claim 1, wherein the first layer has an electrical resistance in a thickness direction of the first layer of less than about 30 m2.

11. The tape of claim 10, wherein the first layer is substantially free of electrically conductive filler particles.

12. The tape of claim 1 having a 180 degree peel strength of at least about 0.25 N/mm from a stainless steel surface.

13. A tape comprising an electrically conductive adhesive first layer having opposite outermost first and second major surfaces, the first layer comprising:

an electrically conductive porous medium; and an adhesive disposed in, and extending through a thickness of, the porous medium to define at the first major surface, first regions of exposed adhesive and first regions of exposed porous medium and to define at the second major surface, second regions of exposed adhesive and second regions of exposed porous medium, wherein, in plan view, the first major surface comprises the first regions of exposed porous medium at P1 percent by area, the second major surface comprises the second regions of exposed porous medium at P2 percent by area, 15%<P1<70%, 30%<P2<95%, P2-P1>5%, wherein when first and second electrical signals propagate in the thickness direction of the first layer between gold and stainless steel surfaces at respective frequencies F1 and F2, any intermodulation signal generated from the first and second electrical signals and having a frequency F3 equal to nF1+mF2, m and n positive or negative integers, has a power of less than about-95 dB relative to a total power of the first and second signals.

14. The tape of claim 13, wherein the first major surface comprises a distribution of the first regions of exposed porous medium comprising a standard deviation of exposed porous medium area percent of less than about 10% when measured over rectangular areas of the first major surface such that each rectangular area of the first major surface has a length and a width each in a range of about 0.7 mm to about 5 mm, and wherein the second major surface comprises a distribution of the second regions of exposed porous medium comprising a standard deviation of exposed porous medium area of less than about 25% when measured over rectangular areas of the second major surface such that each rectangular area of the second major surface has a length and a width each in a range of about 0.7 mm to about 5 mm.

15. The tape of claim 13, wherein 20%<P1<40% and P2-P1>15%.

16. The tape of claim 13, wherein the first layer has an electrical resistance in a thickness direction of the first layer of less than about 300 mΩ, and wherein the first layer is substantially free of electrically conductive filler particles.

17. The tape of claim 13, wherein the first layer has an electrical resistance in a thickness direction of the first layer of less than about 30 mΩ.

18. The tape of claim 17, wherein the first layer is substantially free of electrically conductive filler particles.

* * * * *

UNITED STATES PATENT AND TRADEMARK OFFICE
CERTIFICATE OF CORRECTION

PATENT NO. : 12,241,008 B2
APPLICATION NO. : 18/560465
DATED : March 4, 2025
INVENTOR(S) : Hongyu Gan et al.

It is certified that error appears in the above-identified patent and that said Letters Patent is hereby corrected as shown below:

In the Claims

Column 15

Line 23, In Claim 9, delete "300 m2" and insert -- 300 mΩ --, therefor.

Line 27, In Claim 10, delete "30 m2" and insert -- 30 mΩ --, therefor.

Signed and Sealed this
Thirtieth Day of September, 2025

John A. Squires
*Director of the United States Patent and Trademark Office*